US012592423B2

(12) United States Patent
Li et al.

(10) Patent No.: US 12,592,423 B2
(45) Date of Patent: Mar. 31, 2026

(54) PROCESS AND ITS PRODUCTS FOR SPENT LITHIUM-ION BATTERIES TREATMENT

(71) Applicant: TSINGHUA UNIVERSITY, Beijing (CN)

(72) Inventors: Jinhui Li, Beijing (CN); Jiadong Yu, Beijing (CN); Lili Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 739 days.

(21) Appl. No.: 17/443,818

(22) Filed: Jul. 27, 2021

(65) Prior Publication Data

US 2022/0285750 A1 Sep. 8, 2022

(30) Foreign Application Priority Data

Mar. 8, 2021 (CN) .......................... 202110251131.7

(51) Int. Cl.
  *C22B 7/00* (2006.01)
  *C01G 53/42* (2025.01)
    (Continued)
(52) U.S. Cl.
  CPC ............ *H01M 10/54* (2013.01); *C01G 53/42* (2013.01); *C22B 1/005* (2013.01); *C22B 7/007* (2013.01);
    (Continued)
(58) Field of Classification Search
  None
  See application file for complete search history.

(56) References Cited

FOREIGN PATENT DOCUMENTS

| CN | 102751549 A | * | 10/2012 |
| CN | 107275700 A | * | 10/2017 |
| CN | 110527835 A | * | 12/2019 |

OTHER PUBLICATIONS

CN110527835, Machine-generated English translation (Year: 2019).*
CN 107275700 A, Machine-generated English translation (Year: 2017).*

* cited by examiner

*Primary Examiner* — Yun Qian
(74) *Attorney, Agent, or Firm* — Platinum Intellectual Property PC

(57) ABSTRACT

This invention discloses a process and its products for spent lithium-ion batteries treatment, which relates to the field of spent battery treatment technology. This process comprises: fully discharging spent lithium-ion batteries to obtain discharged spent lithium-ion batteries; crushing spent lithium-ion batteries to obtain crushed products of spent lithium-ion batteries; screening crushed products of spent lithium-ion batteries by screens to obtain an overflow and an underflow; sorting the overflow to obtain separator products, plastic products, iron products, copper foil products and aluminum foil products; mechanochemically activating the underflow to obtain activated products; acid leaching the activated products by degradable organic acid to obtain a mixture containing activated products and the organic acid leaching solution; filtering the mixture which contains the activated products and the organic acid leaching solution to obtain graphite as filter residues. Copper mud products and $LiNi_{0.85}Co_{0.1}Al_{0.05}O_2$ can be obtained after further treatments. This process can effectively recover recyclable resources in spent lithium-ion batteries, and reduce pollution of heavy metals.

15 Claims, 1 Drawing Sheet

(51) Int. Cl.

| | | |
|---|---|---|
| *C22B 1/00* | (2006.01) | |
| *C22B 15/00* | (2006.01) | |
| *C22B 21/00* | (2006.01) | |
| *H01M 10/54* | (2006.01) | |

(52) U.S. Cl.

CPC ...... *C22B 15/0067* (2013.01); *C22B 21/0023* (2013.01); *Y02W 30/84* (2015.05)

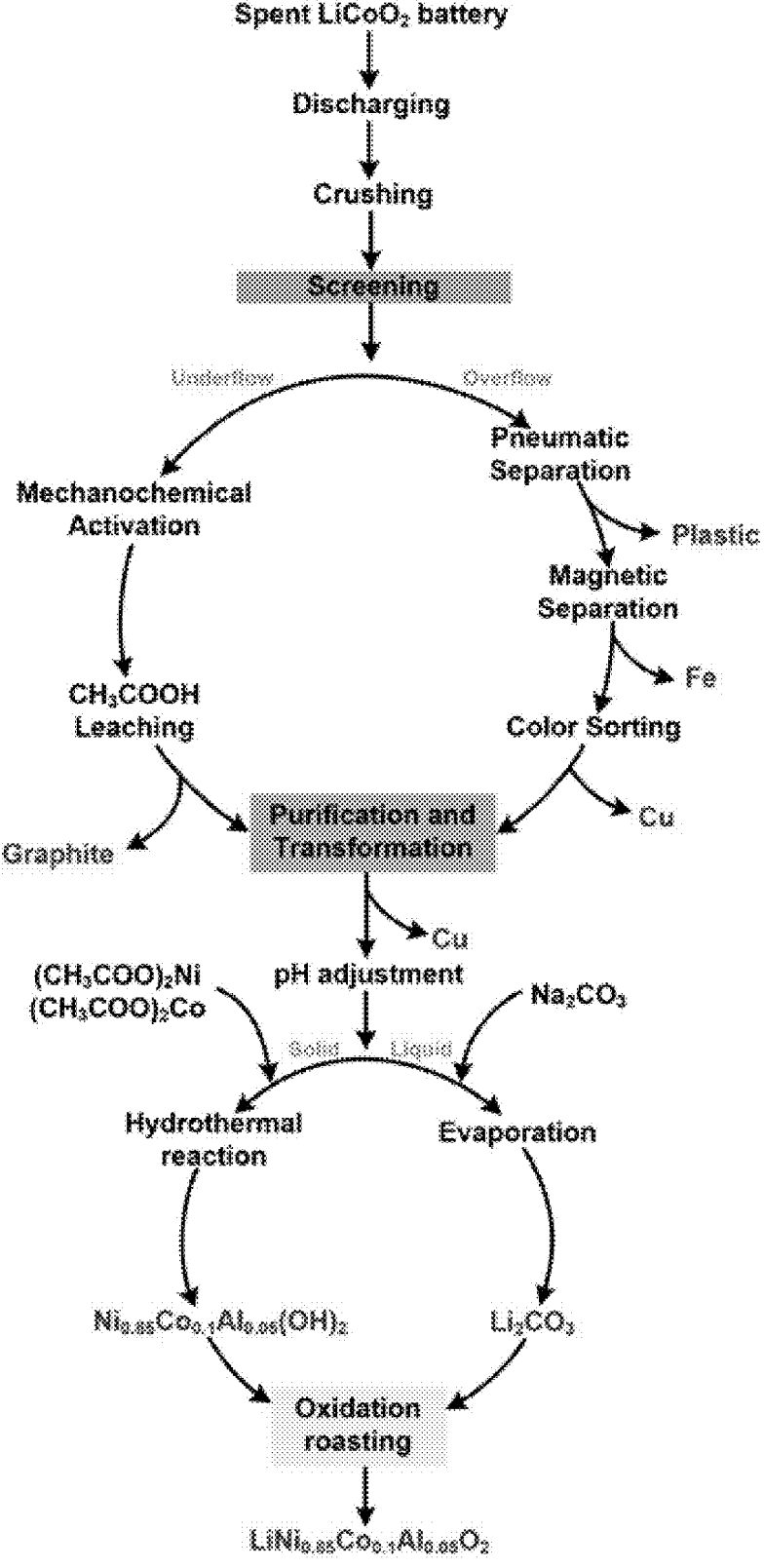

PROCESS AND ITS PRODUCTS FOR SPENT LITHIUM-ION BATTERIES TREATMENT

RELATED APPLICATIONS

This application is a Non-provisional application under 35 USC 111 (a), which claims Chinese Patent Application Serial No. 202110251131.7, filed Mar. 8, 2021, the disclosure of all of which are hereby incorporated by reference in their entirety.

FIELD OF THE INVENTION

The present invention relates to the field of spent battery treatment technology, especially a process and its products for spent lithium-ion batteries treatment.

BACKGROUND OF THE INVENTION

Current technologies of spent lithium-ion batteries treatment not only cause pollution of heavy metals, but also waste resources. There are various recycling technologies of spent lithium-ion batteries, which can mainly divided into pyrometallurgy, hydrometallurgy and bio metallurgy. Pyrometallurgy can recover waste lithium-ion batteries rapidly and efficiently, but its industrialization promotion is restricted by excessive energy consumption, single products composition and high equipment investment. Bio metallurgy can selectively recycle various non-ferrous metals from waste lithium-ion batteries environmentally-friendly, but its application is also restricted by strict reaction conditions, long reaction time and low metal recovery rate. Hydrometallurgy has disadvantages such as high acid consumption and large secondary waste liquid.

CONTENT OF INVENTION

Based on that, the present invention provides a process and its products for spent lithium-ion batteries treatment, which can effectively recover recyclable resources in spent lithium-ion batteries and reduce pollution of heavy metals, so it is more practical.

In order to achieve said first objective, the technology scheme provided by this invention of spent lithium-ion batteries treatment is followed:

The process comprise following steps:

fully discharging spent lithium-ion batteries to obtain discharged spent lithium-ion batteries;

crushing said spent lithium-ion batteries to obtain said crushed products of spent lithium-ion batteries;

screening said crushed products by screens to obtain an overflow and an underflow;

sorting said overflow to obtain separator products, plastic products, iron products, copper foil products and aluminum foil products;

mechanochemically activating said underflow to obtain activated products;

acid leaching said activated products by degradable organic acid to obtain a mixture containing the activated products and the organic acid leaching solution;

filtering the mixture which contains the activated products and the organic acid leaching solution to obtain graphite as filter residues.

The process can be also further accomplished by followed technical measures.

Preferably, said process also comprise following steps:

putting said aluminum foil products into said organic acid leaching solution to conduct purification and transformation, to obtain a mixture of flocculated pure copper mud products and purified leaching solution through displacement reaction;

filtering said mixture of flocculated pure copper mud products and purified leaching solution, then obtaining flocculated pure copper mud products as filter residues and purified leaching solution as filtrate.

Preferably, adding cobalt acetate and nickelous acetate into said purified leaching solution to obtain primary intermediate products;

adding NaOH and buffer solution into said primary intermediate products, controlling pH value between $12\pm0.1$, precipitating after full stirring, then, obtaining a lithium-rich solution as filtrate, and $Ni_{0.85}Co_{0.1}Al_{0.05}(OH)_2$ as filter residues after solid-liquid separation;

adopting hydrothermal reaction for said $Ni_{0.85}Co_{0.1}Al_{0.05}(OH)_2$ to conduct secondary crystallization and precipitation, then, obtaining ternary precursor of lithium-ion batteries;

adding excessive $Na_2CO_3$ into the lithium-rich solution, heating to the first setting temperature, and filtering while it is hot to obtain $Li_2CO_3$;

mixing said ternary precursor of lithium-ion batteries and $Li_2CO_3$ as setting ratio, then, obtaining $LiNi_{0.85}Co_{0.1}Al_{0.05}O_2$ after roasting setting time at the second setting temperature.

Preferably, steps of fully discharging spent lithium-ion batteries to obtain discharged spent lithium-ion batteries comprise:

putting said spent lithium-ion batteries into a NaCl—KCl solution which the mass percentage of solute is between 5%-10% to fully discharge for 40 h-60 h, thereby obtaining secondary intermediate products;

drying said secondary intermediate products to obtain said discharged spent lithium-ion batteries.

Preferably, the step of drying said secondary intermediate products is accomplished in a fume cupboard by natural air drying for 40 h-60 h.

Preferably, steps of crushing said spent lithium-ion batteries to obtain said crushed products of spent lithium-ion batteries comprise:

coarsely crushing said spent lithium-ion batteries by a shearing machine to obtain coarsely crushed spent lithium-ion batteries;

finely crushing said coarsely crushed spent lithium-ion batteries by a pulverizer to obtain said crushed products of spent lithium-ion batteries.

Preferably, the range of mesh size is between 2 mm-6 mm during the step of screening said crushed products of spent lithium-ion batteries by screens to obtain the overflow and the underflow.

Preferably, the screen is the circle vibrating sieve during the step of screening said crushed products of spent lithium-ion batteries by screens to obtain the overflow and the underflow.

Preferably, during the process of sorting said overflow to obtain separator products, plastic products, iron products, copper foil products and aluminum foil products, said separator products and plastic products are obtained by pneumatic separation;

said iron products are obtained by magnetic selection;

said copper foil products are obtained by color sorting;

rest products after said pneumatic separation, magnetic selection and color sorting are aluminum foil products.

preferably, said magnetic selection is conducted repeatedly.

Preferably, the step of mechanochemically activating the underflow is conducted by a planetary ball mill during the process of said mechanochemically activating the underflow to obtain activated products.

preferably, the duration of grinding the underflow in said planetary ball mill is between 1 h-2 h.

preferably, the duration of said precipitation is between 1 h-4 h during the process of adding NaOH and buffer solution into said primary intermediate products, controlling pH between $12\pm0.1$, precipitating after full stirring, and obtaining a lithium-rich solution as filtrate, and $Ni_{0.85}Co_{0.1}Al_{0.05}(OH)_2$ as filter residues after solid-liquid separation.

preferably, the range of said the first setting temperature is between $90°$ C.-$100°$ C. during the process of adding excessive $Na_2CO_3$ into the lithium-rich solution, heating to the first setting temperature, and filtering while it is hot to obtain $Li_2CO_3$.

preferably, the range of the second setting temperature is between $800°$ C.-$900°$ C. during the process of mixing said ternary precursor of lithium-ion batteries and $Li_2CO_3$ as setting ratio and obtaining $LiNi_{0.85}Co_{0.1}Al_{0.05}O_2$ after roasting setting time at the second setting temperature.

preferably, the setting duration is between 10 h-14 h during the process of mixing said ternary precursor of lithium-ion batteries and $Li_2CO_3$ as setting ratio and obtaining $LiNi_{0.85}Co_{0.1}Al_{0.05}O_2$ after roasting for setting time at the second setting temperature.

preferably, the ratio range of maxing said ternary precursor of lithium-ion batteries and $Li_2CO_3$ is 1:(1-1.10).

preferably, said mixing is accomplished by grinding during the process of mixing said ternary precursor of lithium-ion batteries and $Li_2CO_3$ as setting ratio and obtaining $LiNi_{0.85}Co_{0.1}Al_{0.05}O_2$ after roasting setting time at second setting temperature.

In order to achieve said second objective, the technology scheme of products provided by this invention is followed:

This invention of spent lithium-ion batteries treatment provides one or several products of separator products, plastic products, iron products, copper foil produces, aluminum foil products and graphite.

Products provided by the process of spent lithium-ion batteries treatment can be also further accomplished by following technical measures.

Further treatments for products of the process provided by this invention, wherein, putting said aluminum foil products into organic acid leaching solution for purification and transformation to obtain the mixture of pure copper mud products and purified leaching solution;

filtering said mixture of pure copper mud products and purified leaching solution, then obtaining flocculated pure copper mud products as filter residues and purified leaching solution as filtrate.

adding cobalt acetate and nickelous acetate into said purified leaching solution to obtain primary intermediate products;

adding NaOH and buffer solution into primary intermediate products, controlling pH between $12\pm0.1$, precipitating after full stirring; thereby obtaining a lithium-rich solution as filtrate, and $Ni_{0.85}Co_{0.1}Al_{0.05}(OH)_2$ as filter residues after solid-liquid separation;

adopting hydrothermal reaction to conduct secondary crystallization and precipitation for said $Ni_{0.85}Co_{0.1}Al_{0.05}(OH)_2$, then, obtaining ternary precursor of lithium-ion batteries;

adding excessive $Na_2CO_3$ into the lithium-rich solution, heating to the first setting temperature, and filtering while it is hot to obtain $Li_2CO_3$;

mixing said ternary precursor of lithium-ion batteries and $Li_2CO_3$ as setting ratio, then, obtaining $LiNi_{0.85}Co_{0.1}Al_{0.05}O_2$ after roasting setting time at second setting temperature.

According to low oxidation-reduction potential and strong activity of aluminum, large pieces of aluminum foils from products of spent lithium-ion batteries are put into organic acid leaching solution for purification and transformation and element copper is separated out from copper ions in this invention. Importantly, Cu element is insoluble in organic acid, so newborn Cu element can exist stably in acetic acid leaching solution without secondary dissolution. Besides, aluminum ions are not regarded as impurities in this invention. Aluminum foils will be fully used during the process of ternary precursor of lithium-ion batteries preparation as aluminum sources after dissolving into the solution. Based on said analysis and description, the aluminum foils conduct in-situ leaching as a reductant firstly, and then, accomplished self-purification of liquid phase system by its activity, and prepare ternary precursor of lithium-ion batteries as aluminum sources. Thus, this invention is to effectively prepare ternary precursor of lithium-ion batteries form spent primary lithium-ion batteries to achieve across-generation upgrading through the strategy of in-site reduction, self-purification and self-supply.

BRIEF DESCRIPTION OF DRAWING

Other advantages and benefits will be clear for general technicians in this field through reading detailed description of preferred embodiments. The purpose of the drawing is only to show preferred embodiments, rather than restrictions of the invention. Throughout the drawing, same symbols represent same components. In the drawing:

FIG. 1 is a schematic diagram of material transformation in the process of spent lithium-ion batteries treatment provided by the present invention.

SPECIFIC EMBODIMENTS

Based on that, the present invention provides a process and its products for spent lithium-ion batteries treatment, effectively recovering recyclable resources in spent lithium-ion batteries and reducing pollution of heavy metals, which is more practical.

In order to further explain technical means and effects adopted by the present invention to achieve scheduled invention goal, combined with FIG. 1 and the preferred example, detailed explanations about specific embodiment, structures, features and effects of the process and its products for spent lithium-ion batteries treatment are shown in followed contents. In following explanations, different "one example" or "examples" do not necessarily refer to the same examples. Besides, specific features, structures or characteristics in one or several examples can be combined in any suitable form.

Terms and/or, in this paper, are only a kind of association relation describing related objects, indicating 3 relations that could exist. For example, A and/or B can be considered as: including both A and B, existing A alone, existing B alone, which can meet any of the above three situations.

The present process comprise following steps:

fully discharging spent lithium-ion batteries to obtain discharged spent lithium-ion batteries;

crushing spent lithium-ion batteries to obtain crushed products of spent lithium-ion batteries;

screening crushed products by screens to obtain an overflow and an underflow;

sorting overflow to obtain separator products, plastic products, iron products, copper foil products and aluminum foil products;

mechanochemically activating the underflow to obtain activated products;

acid leaching activated products with degradable organic acid to obtain a mixture containing the activated products and the organic acid leaching solution;

filtering the mixture which contains the activated products and the organic acid leaching solution to obtain graphite as filter residues.

Wherein the process of spent lithium-ion batteries treatment also comprises following steps:

putting aluminum foil products into organic acid leaching solution to conduct purification and transformation, to obtain a mixture of flocculated pure copper mud products and purified leaching solution through displacement reaction;

filtering said mixture of flocculated pure copper mud products and purified leaching solution, then obtaining flocculated pure copper mud products as filter residues and purified leaching solution as filtrate.

Wherein, adding cobalt acetate and nickelous acetate into the purified leaching solution to obtain primary intermediate products;

adding NaOH and buffer solution into primary intermediate products, controlling pH value between 12±0.1, precipitating after full stirring, then, and obtaining lithium-rich solution as filtrate, and $Ni_{0.85}Co_{0.1}Al_{0.05}(OH)_2$ as filter residues after solid-liquid separation;

adopting hydrothermal reaction for $Ni_{0.85}Co_{0.1}Al_{0.05}(OH)_2$ to conduct secondary crystallization and precipitation, then, obtaining ternary precursor of lithium-ion batteries;

adding $Na_2CO_3$ into the lithium-rich solution, heating to the first setting temperature, and filtering while it is hot to obtain $Li_2CO_3$;

mixing ternary precursor of lithium-ion batteries and $Li_2CO_3$ as setting ratio, then, obtaining $LiNi_{0.85}Co_{0.1}Al_{0.05}O_2$ after roasting setting time at second setting temperature.

Wherein, steps of fully discharging spent lithium-ion batteries to obtain discharged spent lithium-ion batteries comprise:

putting spent lithium-ion batteries into a NaCl—KCl solution which the mass percentage of solute is between 5%40% to fully discharge 40 h-60 h, thereby obtaining secondary intermediate products;

drying secondary intermediate products to obtain discharged spent lithium-ion batteries.

Wherein, the step of drying secondary intermediate products is accomplished in a fume cupboard by natural air drying for 40 h-60 h.

Wherein, steps of crushing spent lithium-ion batteries to obtain crushed products of spent lithium-ion batteries comprise:

coarsely crushing spent lithium-ion batteries by a shearing machine to obtain coarsely crushed spent lithium-ion batteries;

finely crushing coarsely crushed spent lithium-ion batteries by a pulverizer to obtain said crushed products of spent lithium-ion batteries.

Wherein, the range of mesh size is between 2 mm-6 mm during the step of screening said crushed products of spent lithium-ion batteries by screens to obtain the overflow and the underflow.

Wherein, the screen is the circle vibrating sieve during the step of screening said crushed products of spent lithium-ion batteries by screens to obtain the overflow and the underflow.

Wherein, during the process of sorting said overflow to obtain separator products, plastic products, iron products, copper foil products and aluminum foil products, separator products and plastic products are obtained by pneumatic separation;

iron products are obtained by magnetic selection;

copper foil products are obtained by color sorting;

rest products after said pneumatic separation, magnetic selection and color sorting are aluminum foil products.

Wherein, magnetic selection is conducted repeatedly.

Wherein, the step of mechanochemically activating the underflow is conducted by a planetary ball mill during the process of mechanochemically activating the underflow to obtain activated products.

Wherein, the duration of grinding the underflow in the planetary ball mill is between 1 h-2 h.

Wherein, the duration of precipitation is between 1 h-4 h during the process of adding NaOH and buffer solution into said primary intermediate products, controlling pH between 12±0.1, precipitating after full stirring, and obtaining a lithium-rich solution as filtrate, and $Ni_{0.85}Co_{0.1}Al_{0.05}(OH)_2$ as filter residues after solid-liquid separation.

Wherein, the range of the first setting temperature is between 90° C.-100° C. during the process of adding excessive $Na_2CO_3$ into the lithium-rich solution, heating to the first setting temperature, and filtering while it is hot to obtain $Li_2CO_3$.

Wherein, the range of the second setting temperature is between 800° C.-900° C. during the process of mixing ternary precursor of lithium-ion batteries and $Li_2CO_3$ as setting ratio and obtaining $LiNi_{0.85}Co_{0.1}Al_{0.05}O_2$ after roasting setting time at second setting temperature.

Wherein, the setting duration is between 10 h-14 h during the process of mixing said ternary precursor of lithium-ion batteries and $Li_2CO_3$ as setting ratio and obtaining $LiNi_{0.85}Co_{0.1}Al_{0.05}O_2$ after roasting setting time at the second temperature;

Wherein, the ratio range of maxing said ternary precursor of lithium-ion batteries and $Li_2CO_3$ is 1:(1-1.10);

Wherein, mixing is accomplished by grinding during the process of mixing said ternary precursor of lithium-ion batteries and $Li_2CO_3$ as setting ratio and obtaining $LiNi_{0.85}Co_{0.1}Al_{0.05}O_2$ after roasting setting time at the second setting temperature.

Products of this invention include separator products, plastic products, iron products, copper foil products, aluminum foil products and graphite.

The further treatment of this invention, wherein, putting aluminum foil products into organic acid for purification and transformation to obtain a mixture of pure copper mud products and purified leaching solution;

filtering the mixture of pure copper mud products and purified leaching solution, then obtaining flocculated pure copper mud products as filter residues and purified leaching solution as filtrate.

adding cobalt acetate and nickelous acetate into the purified leaching solution to obtain primary intermediate products;

adding NaOH and buffer solution into primary intermediate products, controlling pH between 12±0.1, precipitating after full stirring, and obtaining a lithium-rich solution as filtrate, and $Ni_{0.85}Co_{0.1}Al_{0.05}(OH)_2$ as filter residues after solid-liquid separation;

adopting hydrothermal reaction to conduct secondary crystallization and precipitation for $Ni_{0.85}Co_{0.1}Al_{0.05}(OH)_2$, then, obtaining ternary precursor of lithium-ion batteries;

adding excessive $Na_2CO_3$ into the lithium-rich solution, heating to the first setting temperature, and filtering while it is hot to obtain $Li_2CO_3$;

mixing ternary precursor of lithium-ion batteries and $Li_2CO_3$ as setting ratio, then, obtaining $LiNi_{0.85}Co_{0.1}Al_{0.05}O_2$ after roasting setting time at the second setting temperature.

Example

As shown in FIG. 1, a process of in-site upgrading spent lithium-ion batteries to Ni—Co—Al ternary lithium-ion batteries comprise following steps:

(1) to ensure safety of experiment processes, putting 100 spent lithium-ion batteries (2.5 kg/each) from phones into a 5% NaCl—KCl solution to fully discharge for 48 h, and drying them in a fume cupboard for 48 h;

(2) coarsely crushing discharged nubbly spent lithium-ion batteries by a shear crusher and finely crushing them by a universal crusher successively to obtain fully dissociated crushed products;

(3) screening and separating crushed products which drop into the circle vibrating screen;

(4) conducting pulsing pneumatic separation firstly for the overflow on the circle vibrating screen, which blow out separator products and plastic products which are light from the upper vent and collected as plastic products, collecting metals sheets or balls from lower vent to the next process;

(5) repeatedly separating metals materials in step (4) through magnetic selection by a magnetic separator, completely removing and collecting flake or spherical magnetic selection products; allowing non-magnetic products to enter the next step;

(6) repeatedly separating non-magnetic products in step (5) through color sorting by a color sorter, completely removing and collecting flake or spherical yellow copper foil products, allowing flake or spherical white aluminum foils products to enter the next step;

(7) putting the underflow in step (3) into a planetary ball mill to grind for 120 minutes for mechanochemical activation;

(8) putting mechanically activated products into an acid leaching system, conducting wet acid leaching with acetic acid;

(9) drying leaching residues obtained in step (8) in an oven as graphite products;

(10) putting large aluminum foil products obtained in step (6) into the leachate solution filtrate in step (6) to conduct purification, transformation and displacement reaction, then, obtaining copper mud products by filtrating, and allowing the purified leachate solution to enter the next step;

(11) for the purified leachate solution obtained in step (10), determining the content of nickel ions and cobalt ions which are need to be added by element quantitative analysis firstly, and then, supplementing cobalt acetate and nickel acetate according to stoichiometric ratio, controlling pH value between 12±0.1 by NaOH and ammonia solution, precipitating after full stirring for 2 h, finally obtaining lithium-rich solution and $Ni_{0.85}Co_{0.1}Al_{0.05}(OH)_2$ solid precipitation by filter separation;

(12) obtaining ternary precursor of lithium-ion batteries with high quality after recrystallization for $Ni_{0.85}Co_{0.1}Al_{0.05}(OH)_2$ solid precipitation in step (11) by hydrothermal reaction;

(13) adding slight excessive $Na_2CO_3$ to the lithium-rich solution obtained in step (11), heating to 95° C., and filtering while it is hot to obtain $Li_2CO_3$;

(14) mixing ternary precursor obtained in step (12) and $Li_2CO_3$ obtained in step (13) as stoichiometric proportion 1:1.05, and grinding them to fully mix, finally obtaining $LiNi_{0.85}Co_{0.1}Al_{0.05}O_2$ after oxygen-enriched roasting at 850° C. for 12 hours.

According to said steps, 20 laboratory scale experiments and 5 industrial pilot-scale experiments were carried out, which fully verified the high-efficiency leaching potential and metal impurity removal ability of aluminum foils in-situ reduction technology. Some experiment results are shown as followed:

1) leaching rate of aluminum foils with in-situ technology in laboratory group A: lithium 99.56%, cobalt 95.21%, aluminum 99.99%;

2) leaching rate of aluminum foils with in-situ technology in laboratory group B: lithium 98.44%, cobalt 96.18%, aluminum 99.98%;

3) leaching rate of aluminum foils with in-situ technology in laboratory group C: lithium 98.96%, cobalt 95.49%, aluminum 99.92%;

4) leaching rate of aluminum foils with in-situ technology in laboratory group D: lithium 97.81%, cobalt 95.95%, aluminum 99.85%;

5) effects of leaching solution purification and transformation in laboratory group A: lithium 18.26 mg/L, cobalt 59.51 mg/L, aluminum 31.25 mg/L; cupper 0.98 mg/L;

6) effects of leaching solution purification and transformation in laboratory group B: lithium 19.26 mg/L, cobalt 61.29 mg/L, aluminum 33.44 mg/L; cupper 0.74 mg/L;

7) effects of leaching solution purification and transformation in laboratory group C: lithium 20.18 mg/L, cobalt 57.42 mg/L, aluminum 25.32 mg/L; cupper 0.64 mg/L;

8) effects of leaching solution purification and transformation in laboratory group D: lithium 18.88 mg/L, cobalt 65.48 mg/L, aluminum 33.18 mg/L; cupper 0.82 mg/L;

9) leaching rate of aluminum foils with in-situ technology in industrial pilot-scale experiments group A: lithium 98.25%, cobalt 94.58%, aluminum 99.99%;

10) leaching rate of aluminum foils with in-situ technology in industrial pilot-scale experiments group B: lithium 96.53%, cobalt 93.79%, aluminum 99.99%;

11) effects of leaching solution purification and transformation in industrial pilot-scale experiments group A: lithium 60.14 mg/L, cobalt 206.43 mg/L, aluminum 117.98 mg/L; cupper 3.26 mg/L;

12) effects of leaching solution purification and transformation in industrial pilot-scale experiments group B:

lithium 49.13 mg/L, cobalt 158.86 mg/L, aluminum 84.92 mg/L; cupper 1.99 mg/L;

Technical principles and technical effects of the invention are as followed:

(1) In-situ reduction leaching technology of inherent zero-valent aluminum in spent lithium-ion batteries strengthened by mechanical activation: Researches have suggested that reduction leaching with aluminum foils as reductant can recover nearly 100% key metal materials such as lithium and cobalt in waste cathode materials. The reaction equation (1) is as follows:

$$6L_iCoO_2 + 2Al + 12H_2SO_4 = 3Li_2SO_4 + 6CoSO_4 + Al_2(SO_4)_3 + 12H_2O \quad (1)$$

However, the efficiency of solid-solid oxidation-reduction reaction between aluminum foils and waste cathode materials in acid leaching liquid phase system is low, so the actual consumption of aluminum foils is much higher than the theoretical value. Additionally, because the crystal structure of waste cathode lithium cobaltate is relatively complete and stable, the reaction is only evoked by corrosive strong acid (sulfuric acid) in in-site leaching technology, rather than biodegradable organic acids to replace strong acid. Thus, this technology brings more environmental impacts. Besides, aluminum reacts with sulfuric acid to generate hydrogen when the aluminum foils are directly involved in reduction leaching, and the specific side reaction is shown in the following reaction equation (2):

$$2Al+3H_2SO_4=Al_2(SO_4)_3+3H_2\uparrow \quad (2)$$

The side reaction product is highly flammable hydrogen, which will accumulate circularly in the actual industrial production to form a serious potential safety hazard, so this technology is seriously limited in practical application.

In this technology, aluminum foils and waste lithium cobaltate are directly contacted and reacted in a planetary ball mill, and the reaction efficiency between aluminum and waste lithium cobaltate is further enhanced by energy input during the grinding process of ball milling medium. Evoked reaction is followed:

$$2Al + 6L_iCoO_2 = 3L_{i2}O + 6CoO + Al_2O_3 \quad (3)$$

The stable crystal structure of waste lithium cobaltate can be destroyed when mechanochemically activating evokes oxidation-reduction reaction directly between aluminum foils and waste lithium cobaltate, generating cobalt oxide and lithium oxide which are easily soluble in acid liquor, so in the subsequent acid leaching process, more than 95% lithium and cobalt can be directly dissolved and leached by using organic acid acetic acid, which effectively replaces the use of corrosive strong acid and significantly reduces the environmental impacts of waste battery recovery. More importantly, there are only 3 reactions (4-6) during acid leaching, which avoid hydrogen generation completely and improve feasibility of industrial application.

$$C_oO + 2CH_3COOH = (CH_3COO)_2Co + H_2O \quad (4)$$

$$L_{i2}O + 2CH_3COOH = 2CH_3COOLi + H_2O \quad (5)$$

$$L_{i2}O + 2CH_3COOH = 2CH_3COOLi + H_2O \quad (6)$$

(2) Metal impurity removal technology from leaching solution based on electrode potential balance: The inherent current collectors in spent lithium-ion batteries are aluminum foils and copper foils, and the ductility of copper foils is slightly inferior to that of aluminum foils, but little copper foils enter the planetary ball mill and wet leaching solution followed with aluminum foils, forming copper ions impurities (cupric acetate monohydrate). The specific side reaction is shown in the following reaction equation (7-8):

$$C_u + 2L_iCoO_2 = L_{i2}O + 2CoO + CuO \quad (7)$$

$$CuO + 2CH_3COOH = (CH_3COO)_2Cu + 2H_2O \quad (8)$$

The conventional method is to remove aluminum and copper from the solution step by step through pH adjustment according to pH difference on precipitation among aluminum, copper and transition metal ions like nickel, cobalt and manganese. The pH value of precipitation beginning and end of related metals are shown in table 1.

It is can be found that pH adjustment can effectively remove aluminum ions and iron ions impurities form transition metal ions such as nickel, cobalt and manganese, but simple pH adjustment causes nickel ions loss because there is an overlap in the pH precipitation intervals of copper and nickel ions. Additionally, pH adjustment consumes a great deal of alkaline solutions and produces a large amount of waste liquid, which greatly increases the cost of industrial production and is difficult to be industrialized.

According to low oxidation-reduction potential and strong activity of aluminum, large pieces of aluminum foils from products of spent lithium-ion batteries are put into organic acid leaching solution for purification and transformation and element copper is separated out from copper ions in this invention. Importantly, Cu element is insoluble in organic acid, so newborn Cu element can exist stably in acetic acid leaching solution without secondary dissolution. Besides, aluminum ions are not regarded as impurities in this invention. Aluminum foils will be fully used during the process of ternary precursor of lithium-ion batteries preparation as aluminum sources after dissolving into the solution. Based on said analysis and description, the aluminum foils conduct in-situ leaching as a reductant firstly, and then, accomplished self-purification of liquid phase system by its activity, and prepare ternary precursor of lithium-ion batteries as aluminum sources. Thus, this invention is to effectively prepare ternary precursor of lithium-ion batteries form spent primary lithium-ion batteries to achieve across-generation upgrading through the strategy of in-site reduction, self-purification and self-supply.

Although the preferred example of this invention has been described, technicians in this field can make modifications and variations when they know basic creative concepts. Thus, the aim of claim is to explain preferred example and all variations and modifications falling within the scope of the invention.

Obviously, technicians in this field can make types of modifications and variations to the invention without departing from its spirit and scope. If these modifications and variations are in the scope of claim and equivalent technologies, this invention intends to include them.

The invention claimed is:

1. A process of spent lithium-ion batteries treatment, wherein features comprise:

discharging spent lithium-ion batteries to obtain discharged spent lithium-ion batteries;

crushing said spent lithium-ion batteries to obtain said crushed products of spent lithium-ion batteries;

screening said crushed products of spent lithium-ion batteries by screens to obtain an overflow and an underflow;

sorting said overflow to obtain separator products, plastic products, iron products, copper foil products and aluminum foil products;

mechanochemically activating said underflow to obtain activated products;

acid leaching said activated products by degradable organic acid to obtain a mixture containing leached activated products and the organic acid leaching solution;

filtering the mixture which contains the leached activated products and the organic acid leaching solution to obtain graphite as filter residues;

putting said aluminum foil products into said organic acid leaching solution to conduct purification and transformation, causing a displacement reaction, resulting in a mixture of flocculated pure copper mud products and purified leaching solution; and filtering said mixture of flocculated pure copper mud products and purified leaching solution, then obtaining flocculated pure copper mud products as filter residues and purified leaching solution as filtrate, wherein the purified leaching solution further comprising:

determining the content of nickel ions and cobalt ions of the purified leaching solution by element quantitative analysis firstly, and adding cobalt acetate and nickel acetate according to stoichiometric ratio determined by the element quantitative analysis, controlling pH value between $12\pm0.1$ by adding NaOH and ammonia solution, precipitating after stirring for 2 hours, finally obtaining lithium-rich solution and $Ni_{0.85}Co_{0.1}Al_{0.05}(OH)_2$ solid precipitation by filter separation.

2. The process as claimed in claim 1, wherein features comprise:

adding cobalt acetate and nickel acetate into said purified leaching solution to obtain primary intermediate products;

adding NaOH and buffer solution into said primary intermediate products, controlling pH value between $12\pm0.1$, precipitating after stirring, then, obtaining a lithium-rich solution as filtrate, and $Ni_{0.85}Co_{0.1}Al_{0.05}(OH)_2$ as filter residues after solid-liquid separation;

adopting hydrothermal reaction for said $Ni_{0.85}Co_{0.1}Al_{0.05}(OH)_2$ to conduct crystallization and precipitation, then, obtaining ternary precursor of lithium-ion batteries, wherein the ratio range of mixing said ternary precursor of lithium-ion batteries and $Li_2CO_3$ is 1:(1-1.10);

adding $Na_2CO_3$ into said lithium-rich solution, heating to a first setting temperature, and filtering while it is hot to obtain $Li_2CO_3$; and mixing said ternary precursor of lithium-ion batteries and $Li_2CO_3$, then, obtaining $LiNi_{0.85}Co_{0.1}Al_{0.05}O_2$ after roasting at a second setting temperature.

3. The process as claimed in claim 2, wherein duration of precipitation is between 1 hour-4 hours during the process of adding NaOH and buffer solution into primary intermediate products, controlling pH between $12\pm0.1$, precipitating after stirring and obtaining a lithium-rich solution as filtrate, and $Ni_{0.85}Co_{0.1}Al_{0.05}(OH)_2$ as filter residues after solid-liquid separation.

4. The process as claimed in claim 2, wherein the range of said first setting temperature is between 90° C.-100° C. during the process of adding excessive $Na_2CO_3$ into the lithium-rich solution, heating to the first setting temperature, and filtering while it is hot to obtain $Li_2CO_3$.

5. The process as claimed in claim 2, wherein the range of said second setting temperature is between 800° C.-900° C. during the process of mixing said ternary precursor of lithium-ion batteries and $Li_2CO_3$ as setting ratio and obtaining $LiNi_{0.85}Co_{0.1}Al_{0.05}O_2$ after roasting setting time at the second setting temperature.

6. The process as claimed in claim 2, wherein the range of said second setting temperature is between 800° C.-900° C. during the process of mixing said ternary precursor of lithium-ion batteries and $Li_2CO_3$ as setting ratio and obtaining $LiNi_{0.85}Co_{0.1}Al_{0.05}O_2$ after roasting setting time at the second setting temperature.

7. The process as claimed in claim 2, wherein said mixing is accomplished by grinding during the process of mixing said ternary precursor of lithium-ion batteries and $Li_2CO_3$ as setting ratio and obtaining $LiNi_{0.85}Co_{0.1}Al_{0.05}O_2$ after roasting for setting time at the second temperature.

8. The process as claimed in claim 1, wherein features of discharging spent lithium-ion batteries to obtain discharged spent lithium-ion batteries comprise following steps:

putting said spent lithium-ion batteries into a NaCl—KCl solution which the mass percentage of solute is between 5%-10% to discharge for 40 hours-60 hours, thereby obtaining secondary intermediate products;

drying said secondary intermediate products to obtain said discharged spent lithium-ion batteries.

9. The process as claimed in claim 8, wherein the step of drying said secondary intermediate products is accomplished in a fume cupboard by natural air drying for 40 hours-60 hours.

10. The process as claimed in claim 1, wherein features of crushing spent lithium-ion batteries to obtain crushed products of spent lithium-ion batteries comprise following steps:

coarsely crushing said spent lithium-ion batteries by a shearing machine to obtain coarsely crushed spent lithium-ion batteries;

finely crushing said coarsely crushed spent lithium-ion batteries by a pulverizer to obtain said crushed products of spent lithium-ion batteries.

11. The process as claimed in claim 1, wherein the range of mesh size is between 2 millimeters-6 millimeters during the step of screening said crushed products of spent lithium-ion batteries by screens to obtain the overflow and the underflow.

12. The process as claimed in claim 1, wherein the screen is the circle vibrating sieve during the step of crushing spent lithium-ion batteries to obtain crushed products of spent lithium-ion batteries.

13. The process as claimed in claim 1, wherein, during the process of sorting said overflow to obtain separator products, plastic products, iron products, copper foil products and aluminum foil products, said separator products and plastic products are obtained by pneumatic separation;

said iron products are obtained by magnetic selection;

said copper foil products are obtained by color sorting;

rest products after said pneumatic separation, magnetic selection and color sorting are aluminum foil products.

14. The process as claimed in claim 13, wherein said magnetic selection is conducted repeatedly.

15. The process as claimed in claim 1, wherein the step of mechanochemically activating of said underflow is conducted by a planetary ball mill during the process of said mechanochemically activating the underflow to obtain activated products.

* * * * *